May 30, 1939.　　S. J. ERLING　　2,160,651
PULSATOR FOR MILKING MACHINES
Filed Nov. 29, 1937
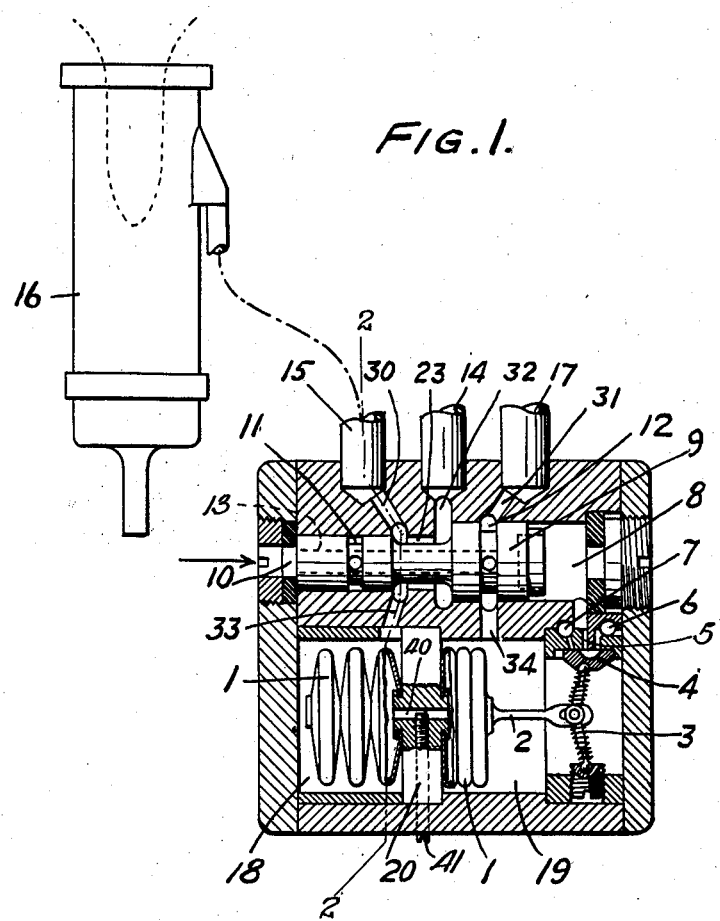
FIG. 1.
FIG. 2.
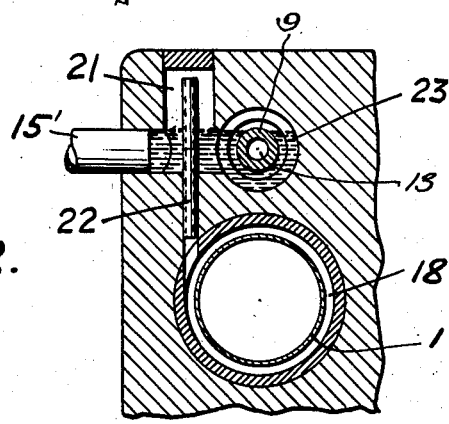
INVENTOR
Sven Johan Erling
BY
Busser and Harding
ATTORNEYS.

Patented May 30, 1939

2,160,651

UNITED STATES PATENT OFFICE 2,160,651

PULSATOR FOR MILKING MACHINES

Sven Johan Erling, Nockeby, Sweden, assignor to The De Laval Separator Company, New York, N. Y., a corporation of New Jersey Application November 29, 1937, Serial No. 176,982
In Sweden December 3, 1936

2 Claims. (Cl. 31—69)

Pulsators for milking machines may be divided into two different principal types, one of which is built on the slide valve principle and the other on the poppet valve principle. A pulsator of the first type comprises a slide reciprocating in a cylinder bore and alternately opening and closing openings, provided in the wall of the cylinder, through which communication of the teat cups with atmospheric pressure and a source of partial vacuum is effected. In pulsators of the other type, of which that shown in the Forsberg Patent No. 2,042,300 is an example, the opening and closing of the said communications are effected by a number of poppet valves, which are generally controlled by a diaphragm, one or more bellows, or the like.

The object of the pulsators is to effect pneumatic pulsations in the pressure existing in the annular chamber between the rigid wall of the teat cup and the flexible and elastic teat cup liner which during milking embraces the teat. The liner may sometimes become damaged, so that the milk leaks out into said chamber. Such milk finally penetrates into the pulsator and comes into contact with its slides or valves and other movable parts.

Experience has shown, however, that milk leaking into the pulsator causes much more serious disturbances in the operation of a pulsator of the poppet valve type than in the operation of a pulsator of the slide type. This is particularly the case if the valves of the poppet valve type of pulsator are controlled by one or two diaphragms or bellows, which when leakage occurs are also exposed to the action of the milk. The collected or deposited milk dries between the period of milking and on the occasion of the next milking it is found that the pulsator does not operate. It then becomes necessary to disassemble the pulsator for cleaning, that is, for removal of the dried milk. With a pulsator of the slide type this is a very simple job which can be effected on the spot by simply taking out and wiping the slide and the bore. To remove the dried milk from a poppet valve pulsator—especially if it be provided with bellows—is however a complicated and difficult operation, it being in most cases necessary to return the pulsator to the factory for the necessary renovation.

However, the use of one or two bellows for the control of the pulsator has advantages so great that it is undesirable to sacrifice them. A system of bellows or diaphragms of this kind has, however, a small reversing power in relation to the frictional resistances to which the slide may be exposed. Heretofore diaphragms have been used to advantage for the reversing of valves in which the frictional resistance to their movement is comparatively inconsiderable. While it is possible to build a slide with, for instance, a diaphragm acting thereon for reversing the slide, the frictional resistance to the operation of the slide would be such that the pulsator would not offer a sufficient degree of safety of operation. Further, the bellows or the diaphragm would not be protected from coming into contact with the milk when it leaks into the pulsator.

The present invention embodies a pulsator which combines the advantages of the slide pulsator and the bellows pulsator, in that a primary bellows or diaphragm-controlled pulsator built in the pulsator housing generates the primary pulsations which in turn act on a secondary pulsator of the slide type, and in which provision is made to insure that milk entering the secondary pulsator does not penetrate into the primary pulsator.

In the accompanying drawing, which illustrates a preferred embodiment of the invention—

Fig. 1 is a vertical sectional view showing all the details of construction except the means to prevent leaking milk penetrating to the primary pulsator. Fig. 2 is a partial transverse sectional view on the line 2—2 of Fig. 1 of a modification including means to prevent such milk penetration.

The primary pulsator comprises two expansible and contractible fluid containers, which may have the shape of bellows I, I. These bellows are contained in air chambers 18 and 19. The bellows may be secured in annular grooves formed in projections from opposite sides of the wall 20 separating chambers 18 and 19 and communicate with one another by means of a channel 40 formed in such wall. The channel may be throttled by making the channel of sufficiently small diameter or by contracting its central part or it may be adjustably throttled by means, for example, of a rod 41 threaded in the wall 20 and extending into the channel 40. A similar connecting channel is disclosed in the Forsberg patent above mentioned. These bellows I, I, or one of them, may be connected by a rod 2 with a reversing mechanism 3 of known type, by means of which a slide valve 4 is operated. The slide valve 4 is adapted to place a port 5 alternately in communication with a port 6 and a port 7. The port 5 communicates with one end of the chamber 8 of the secondary pulsator. Ports 6 and 7 communicate respectively with a source of low pressure (partial vacuum) and a source of high pressure (atmosphere). A pulsating pressure is thus generated in the port 5 and pulsator chamber 8. It will be understood that the connection between the rod 2 and the valve 4 is such that the valve 4 will not begin to shift until after there has been a certain volume of flow between the bellows, after which it will shift quickly.

The chamber 8 shown in Fig. 1 is of that known type which comprises a cylindrical bore of greater diameter at one end than at the other while the slide valve 9 comprises a shank which has a sliding fit in the smaller diameter section of the valve chamber and a head which has a sliding fit in the greater diameter section. The smaller diameter head of the valve is subject to constant atmospheric pressure through the opening 10 in one end wall of the casing. Since the large diameter head of the valve is subject to alternate atmospheric pressure and vacuum, the slide 9 is thereby reciprocated.

In the wall of the chamber 8 are ports 30, 31, 32, 33 and 34. Port 30 connects with a nipple 15 communicating with the pulsation chamber of one pair of teat cups 16, of which one is shown. Port 31 connects with a nipple 17 communicating with the other pair of teat cups. Port 32 connects with a nipple 14 which communicates with a source of partial vacuum. Ports 33 and 34 open respectively into chambers 18 and 19. The smaller diameter section of the valve 9 has a reduced or neck portion, forming a chamber 23 adjacent the larger diameter section of the valve.

The two sections of the valve are provided with annular grooves 11 and 12 which are in constant communication with the atmosphere through an axial channel 13 and the opening 10.

When the valve 9 is in the position shown in Fig. 1, air chamber 18 and the pulsation chambers of two of the teat cups are under vacuum, while the other air chamber 19 and the pulsation chambers of the other two teat cups are under atmospheric pressure. These connections are reversed when the valve 9 is shifted to the right.

When there is atmospheric pressure in one air chamber 18, the bellows provided in this chamber is compressed and the air contained therein is forced over to the bellows in the other chamber, in which there is then a vacuum. As soon as the bellows in one chamber has been compressed and the bellows in the other chamber has expanded to a certain degree, the slide valve 4 is reversed and thereby also the valve 9, which brings about a reversal of pressures in the chambers 18 and 19, so that the rod 2 starts moving in the opposite direction.

In Fig. 1 the nozzles communicating with the teat cup are shown, for the purpose of complete illustration, as positioned on the top of the secondary pulsation chamber. It is preferred, however, to have the nozzles project from the side of the secondary pulsation chamber, as shown at 15' in Fig. 2, in order to more conveniently provide for free air flow to and from chambers 18 and 19 while preventing inflow thereto of leaking milk. The means effecting this object comprises a small diameter tube 22 extending from each of these chambers (Fig. 2 shows its application to chamber 18) into a chamber 21 communicating with the secondary pulsation chamber. Port 33 is eliminated, the tube 22 performing the function of that port as an air passage. Any milk entering through the nipple 15 flows into the secondary pulsation chamber. A great accumulation of milk in the chamber 21 cannot take place and the level of the liquid cannot reach higher than to the position indicated by the fluid in Figure 2. The upper orifice of the tube 22 is therefore always free from milk, and the bellows in chamber 18 is consequently protected from contact with the milk. Similar means are provided for connecting chamber 19 with high and low air pressure, while excluding flow of leaked milk thereinto. The port 5, which runs from the slide 4 of the primary pulsator, may be desirably connected in the same manner with the chamber 8, so that milk cannot flow from the latter to the former.

What I claim and desire to protect by Letters Patent is:

1. A milking machine pulsator comprising means providing air passages adapted to communicate respectively with sources of high and low pressure, two air chambers, two expansible and contractable fluid containers positioned in the respective air chambers, a conduit allowing flow of fluid back and forth between said containers, said containers and conduit forming a closed system, a pneumatically actuable slide valve adapted to connect the two chambers with the high and low pressure passages respectively and reverse such connections, valve mechanism operable to control the pneumatic actuation of the slide valve, and means, operable by the containers during expansion and contraction thereof, due to changes of pressure in their respective chambers, controlling the operation of said valve mechanism.

2. A milking machine pulsator comprising means providing air passages adapted to communicate with sources of high and low pressure, two air chambers, two expansible and contractable fluid containers positioned in the respective air chambers, a conduit allowing flow of fluid back and forth between said containers, said containers and conduit forming a closed system, teat cups, tubes connected with the respective teat cups, a secondary pulsation chamber having two pairs of passages, the two passages of one pair connecting the valve chamber with respectively one air chamber and one teat cup and the two passages of the other pair connecting the valve chamber with respectively the other air chamber and the other teat cup, a pneumatically actuable slide valve in said secondary pulsation chamber adapted in one position to connect one pair of passages with the source of high pressure and the other pair of passages with the source of low pressure and in another position to reverse said connections, valve mechanism adapted to control the pneumatic actuation of the slide valve, and means, operable by the containers during expansion and contraction thereof, due to changes of pressure in their respective chambers, controlling the operation of the last named valve mechanism.

SVEN JOHAN ERLING.